United States Patent [19]
Pittella

[11] Patent Number: 5,360,192

[45] Date of Patent: * Nov. 1, 1994

[54] BRACKET FOR CANTILEVER MOUNTING OF SHELVES AND CABINETS

[76] Inventor: Joseph A. Pittella, 42 Riviera Dr., San Remo, N.Y. 11754

[*] Notice: The portion of the term of this patent subsequent to Oct. 25, 2001 has been disclaimed.

[21] Appl. No.: 67,568

[22] Filed: May 26, 1993

Related U.S. Application Data

[63] Continuation-in-part of Ser. No. 929,407, Aug. 11, 1992, Pat. No. 5,271,591.

[51] Int. Cl.$^5$ ............................................. A47G 29/02
[52] U.S. Cl. ........................... 248/250; 108/152; 248/298; 248/345
[58] Field of Search ............ 248/235, 239, 241, 246, 248/250, 298, 313, 316.3, 345; 108/152

[56] References Cited

U.S. PATENT DOCUMENTS

| | | | |
|---|---|---|---|
| 3,606,229 | 9/1971 | Wall | 248/345 |
| 3,672,624 | 6/1972 | Keller | 248/345 |
| 4,691,887 | 9/1987 | Bessinger | 248/250 |
| 4,733,843 | 3/1988 | Bessinger | 248/250 |
| 4,736,918 | 4/1988 | Bessinger | 248/235 X |
| 4,736,919 | 4/1988 | Bessinger | 248/250 |
| 4,738,426 | 4/1988 | Bessinger | 248/250 |
| 4,856,746 | 8/1989 | Wrobel et al. | 248/239 X |
| 4,871,136 | 10/1989 | Bessinger et al. | 248/250 |
| 5,271,591 | 12/1993 | Pittella | 248/250 |

Primary Examiner—Ramon O. Ramirez

[57] ABSTRACT

A bracket for mounting articles such as shelves, racks and cabinets in a cantilever fashion includes a strip which can be attached to a wall or the like. The bracket further includes two triangular holding components which are designed to be releasably mounted on the strip in such a manner that they are superimposed with one another and project from the strip. The upper holding component carries a clamping plate which is arranged to be located between the holding components. The clamping plate is movable in a direction from the upper holding component towards the lower holding component by moving mechanisms housed in the upper holding component. This allows part of an article to be gripped between the clamping plate and the lower holding component to thereby mount the article on the bracket. A cover may be disposed over each of the holding components. In order to hold the covers in place, the sides of the strip are formed with grooves which can receive protruding portions of the covers.

78 Claims, 3 Drawing Sheets

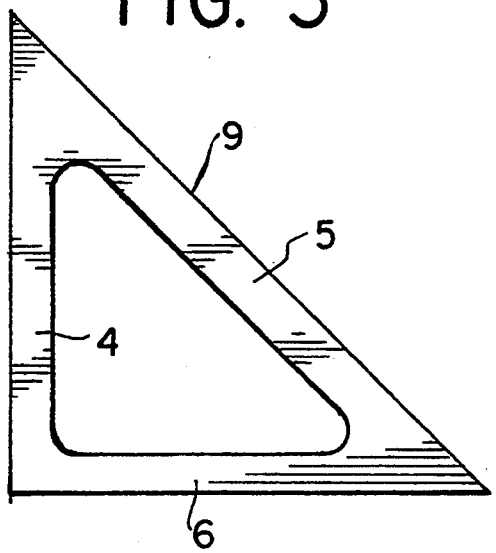
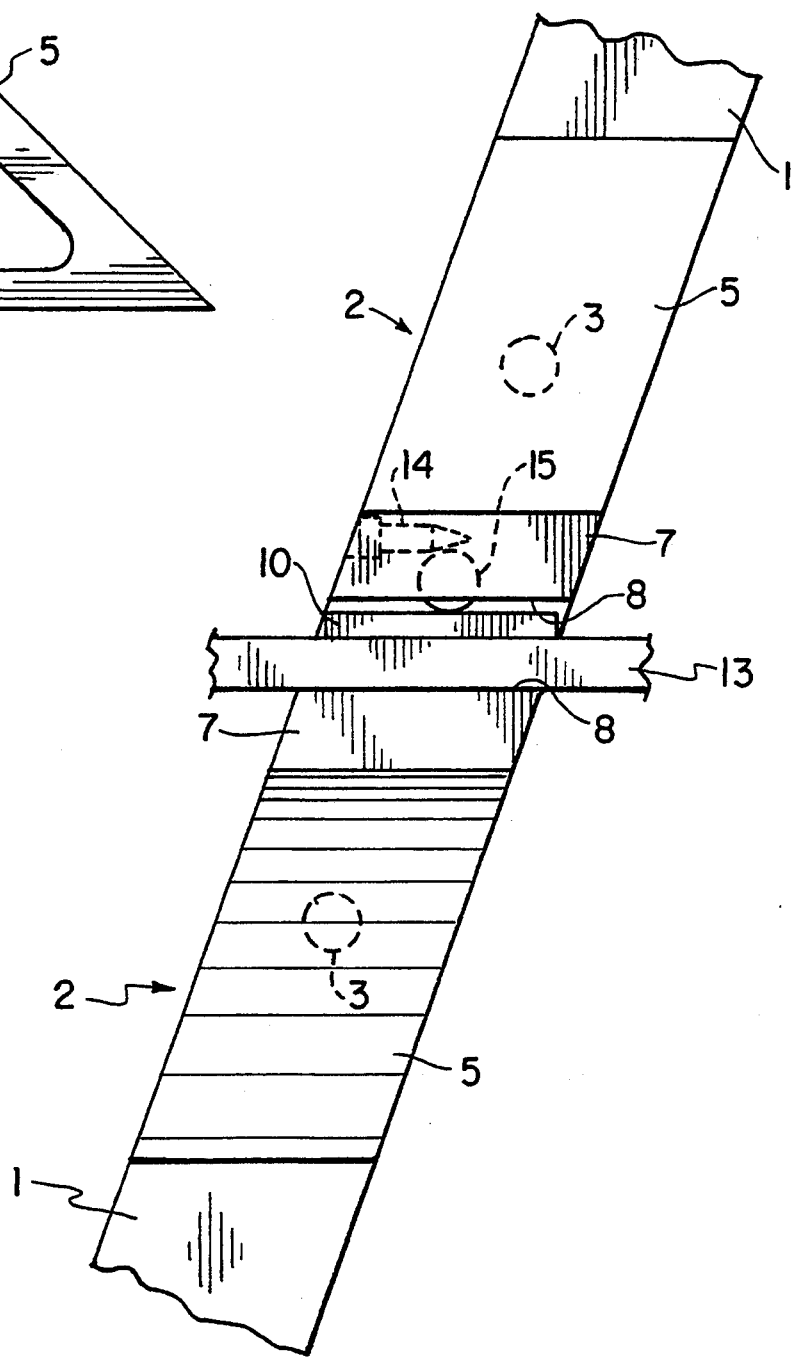

BRACKET FOR CANTILEVER MOUNTING OF SHELVES AND CABINETS

CROSS-REFERENCE TO RELATED APPLICATION

This application is a continuation-in-part of application Ser. No. 07/929,407 filed Aug. 11, 1992, now U.S. Pat. No. 5,271,591.

BACKGROUND OF THE INVENTION

The invention relates generally to a mounting bracket.

More particularly, the invention relates to a bracket for mounting articles such as shelves, cabinets and racks.

Applicant's prior application Ser. No. 07/929,407 discloses a bracket for mounting articles of this type in a cantilever fashion. The bracket comprises a mounting strip which carries a pair of coextensive projections. A clamping or pressure plate is disposed between the projections and is coextensive therewith. The plate, which is adjacent to a first one of the projections, can be moved towards the second projection by adjusting a set screw on the first projection. The set screw acts on the plate indirectly via a ball bearing, and the arrangement is such that the set screw causes the ball bearing and the plate to be shifted in a direction normal to the longitudinal axis of the set screw. This arrangement makes for convenient manipulation of the plate. As the ball bearing shifts under the action of the set screw, the plate moves so as to clamp an article between itself and the second projection.

The bracket of Applicant's prior application has the advantage that it can be relatively narrow yet support a relatively wide article in cantilever fashion. However, it has been found that some improvement is desirable as regards versatility, appearance, convenience and strength.

SUMMARY OF THE INVENTION

It is an object of the invention to provide a mounting bracket having increased versatility.

Another object of the invention is to provide a mounting bracket which can have greater aesthetic appeal.

An additional object of the invention is to provide a mounting bracket which can be handled more conveniently.

A further object of the invention is to provide a mounting bracket which can generate better support.

The preceding objects, as well as others which will become apparent as the description proceeds, are achieved by the invention.

The invention resides in a bracket for mounting articles such as shelves, racks and cabinets, especially a bracket for mounting articles of this type in a cantilever fashion. The bracket comprises first and second projections or holding elements, and means for clamping part of an article between the projections. The clamping means includes a clamping element receivable between the projections for movement in a direction from one of the projections towards the other of the projections, and means for moving the clamping element in this direction.

According to one embodiment of the invention, the projections are independently mountable. This makes it possible to achieve relatively great versatility or flexibility.

In accordance with another embodiment of the invention, the bracket includes a cover for one or both projections. The cover or covers allow the appearance of the bracket to be enhanced.

According to a further embodiment of the invention, the projections have respective clamping surface portions arranged to face one another. The bracket comprises a support for the projections, and at least one of the clamping surface portions is substantially flat and designed to be inclined to the support so that a flat article can be held substantially horizontally when the support is inclined. This enables an aesthetically pleasing, somewhat abstract effect to be obtained.

In accordance with an additional embodiment of the invention, the clamping element is discrete from the projections, and the bracket includes means for holding the clamping element on one of the projections. The discrete clamping element makes for a relatively great degree of flexibility while the holding means permits the clamping element to be manipulated conveniently.

Aside from its clamping surface portion, each projection has an external additional surface portion. It is preferred for the clamping and additional surface portions of at least one projection to diverge at an angle different from 90 degrees and to be oriented and designed so that loads on such projection are transmitted to a support for the projection. In this manner, the strength of the bracket can be increased. Advantageously, the projection or projections are generally triangular.

The novel features which are considered as characteristic of the invention are set forth in particular in the appended claims. The improved bracket itself, however, both as to its construction and its mode of operation, together with additional features and advantages thereof, will be best understood upon perusal of the following detailed description of certain specific embodiments when read in conjunction with the accompanying drawings.

BRIEF DESCRIPTION OF THE DRAWINGS

FIG. 3 is a side view of another embodiment of a holding element which can be used in the bracket of FIG, 1;

FIG. 4 is a fragmentary front view of an additional embodiment of the bracket;

DESCRIPTION OF THE PREFERRED EMBODIMENTS

Figure 1:
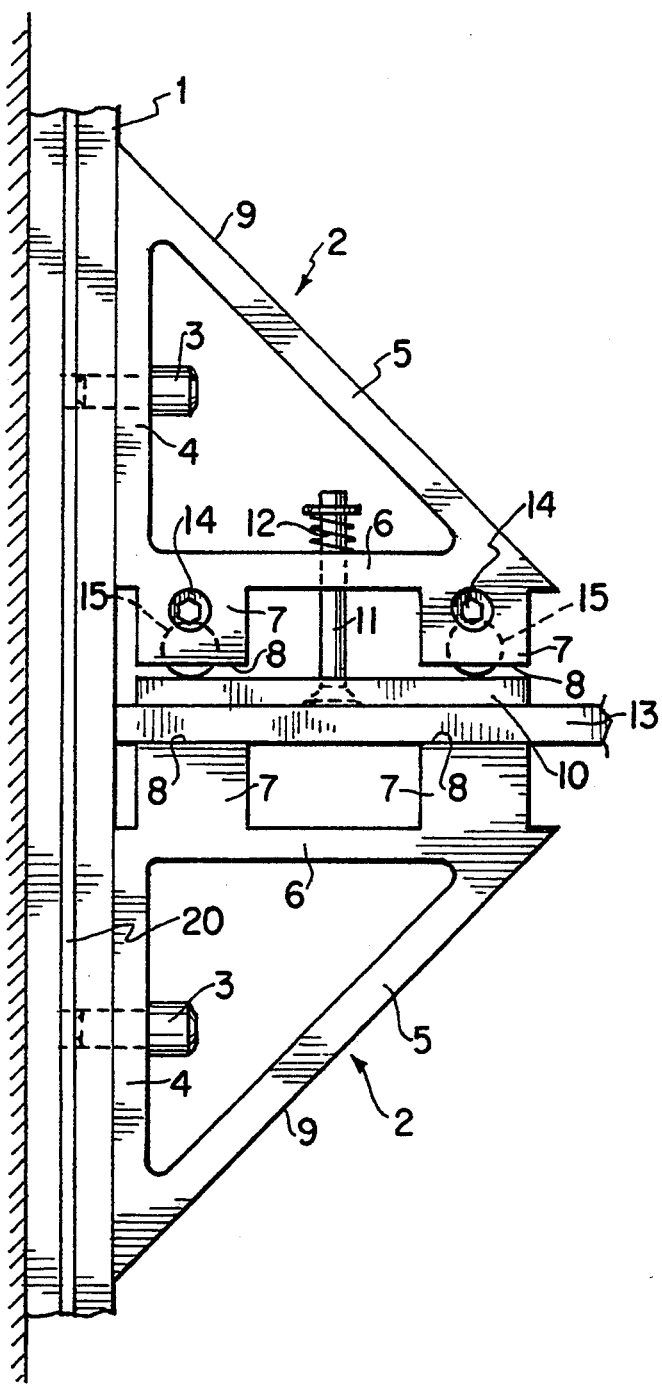
FIG. 1 is a fragmentary side view of a bracket according to the invention showing a pair of holding elements.
Figure 2:
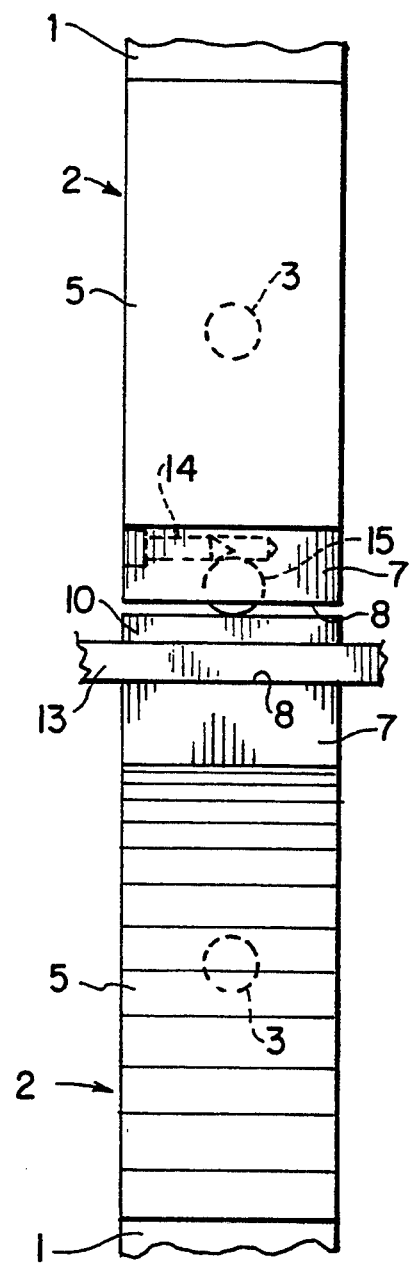
FIG. 2 is a fragmentary front view of the bracket of FIG, 1.

FIGS. 1 and 2 show a bracket for mounting articles, especially articles such as shelves, racks, cabinets, etc. The illustrated bracket, which is designed to clamp a flat part of an article, is particularly well-adapted to mount articles in a cantilever fashion.

The bracket includes a strip-shaped support 1 which can be affixed to a wall or the like so as to extend vertically. The bracket further includes a pair of projections or holding elements 2 which can be independently mounted on the support 1. The projections 2 are here releasably secured to the support 1 by means of fasteners 3 in the form of screws or bolts. The projections 2 are superimposed with one another and are coextensive.

As best seen from FIG. 2, the support 1 and the projections 2 can be relatively narrow. The support 1 and the projections 2 have the same width so that the sides of the support 1 and the projections 2 are flush with one another.

The projections 2 are generally triangular and include three legs 4, 5 and 6. The legs 4 of the projections 2 are affixed to the support 1 via the screws 3. If necessary or desirable for stability, the leg 4 of each projection 2 may additionally be connected to the support 1 by two roll pins. The legs 6 of the projections 2 confront one another, and each of the legs 6 is provided with a pair of protuberances 7 having flat clamping surfaces or clamping surface portions 8.

The leg 5 of each projection 2, which connects the leg 4 with the leg 6, diverges from the respective leg 6 as considered in a direction from the front towards the rear of the projection 2, i.e., as considered in a direction away from the junction of the legs 5 and 6. Similarly, the flat external surface or surface portion 9 of a leg 5 diverges from the respective clamping surfaces 8 as considered in such direction. The angle of divergence is selected so that loads entering the projections 2 through the protuberances 7 are effectively transmitted to the support 1.

A flat clamping or pressure plate 10 is disposed between the projections 2 and is discrete from the latter. The clamping plate 10 has the same width as the support 1 and the projections 2 so that the sides of the clamping plate 10 are flush with the sides of the support 1 and the projections 2. The clamping plate 10 is coextensive with the projections 2, or at least approximately so.

The clamping plate 10 is held on one of the projections 2, preferably the upper projection 2 as shown, by means of a rod or rod-like element 11. The rod 11 extends vertically intermediate the protuberances 7 of the upper projection 2 and passes through the leg 6 of this projection. The lower end of the rod 11 is fast with the clamping plate 10 while the upper end of the rod 11 is located above the leg 6 of the upper projection 2. The upper end of the rod 11 has a collar or enlargement, and a spring 12 surrounds the portion of the rod 11 between the collar and the upper surface or upper surface portion of the leg 6. The spring 12 bears against the collar and against the upper surface of the leg 6 to thus urge the clamping plate 10 towards the upper projection 2.

The illustrated bracket is designed to clamp a flat part of an article 13, which is here assumed to be a shelf, between the clamping plate 10 and the lower projection 2. To this end, the clamping plate 10 is movable in a direction from the upper projection 2 towards the lower projection 2. The clamping plate 10 is displaced in this direction via two moving mechanisms of the type disclosed in Applicant's U.S. Pat. No. 5,271,591. Each of the moving mechanisms is housed in a respective protuberance 7 of the upper projection 2 and includes a horizontal set screw 14 as well as a ball bearing 15. The arrangement is such that, as a set screw 14 is shifted inwards, it forces the corresponding ball bearing 15 to move downwards thereby clamping the shelf 13 between the clamping plate 10 and the lower projection 2.

The projections 2 are shown as being hollow and this is preferred in order to achieve material and weight savings. However, the projections 2 could also be solid. Furthermore, as illustrated in FIG. 3, the protuberances 7 on the upper projection 2 and/or the lower projection 2 may be eliminated. If the protuberances 7 on the upper projection 2 are eliminated, the leg 6 of the upper projection 2 can be made sufficiently thick to house the moving mechanisms 14, 15.

The bracket of FIGS. 1 and 2 exhibits many advantages. Due to the fact that the projections 2 and clamping plate 10 are at least approximately coextensive, the bracket can support an article much wider than itself. Moreover, the generally triangular configuration of the projections 2 imparts great strength and rigidity to the bracket. The feature that the projections 2 can be mounted independently of one another, and the feature that the projections 2 are releasably connected to the support 1, provides the bracket with a great deal of versatility and flexibility. In addition, the mounting of the clamping plate 10 on one of the projections 2 facilitates the handling of the bracket.

FIG. 4, where the same reference numerals as before are used to identify similar elements, illustrates another embodiment of the bracket. The bracket of FIG. 4 differs from that of FIGS. 1 and 2 primarily in the angular relationship between the support 1 and the clamping surfaces 8, and the angular relationship between the support 1 and the edges defined by the corners of the projections 2.

In FIGS. 1 and 2, the support 1 or its longitudinal axis extends perpendicular to the clamping surfaces 8 and the edges defined at the corners of the projections 2. In FIG. 4, on the other hand, the support 1 or its longitudinal axis is inclined to the clamping surfaces 8 and the edges defined at the corners of the projections 2. As shown in FIG. 4, this makes it possible to mount the bracket on a wall or the like at an inclination while nevertheless allowing the bracket to hold the shelf 13 horizontally. The bracket of FIG. 4 permits somewhat of an abstract effect to be achieved.

Figure 5:
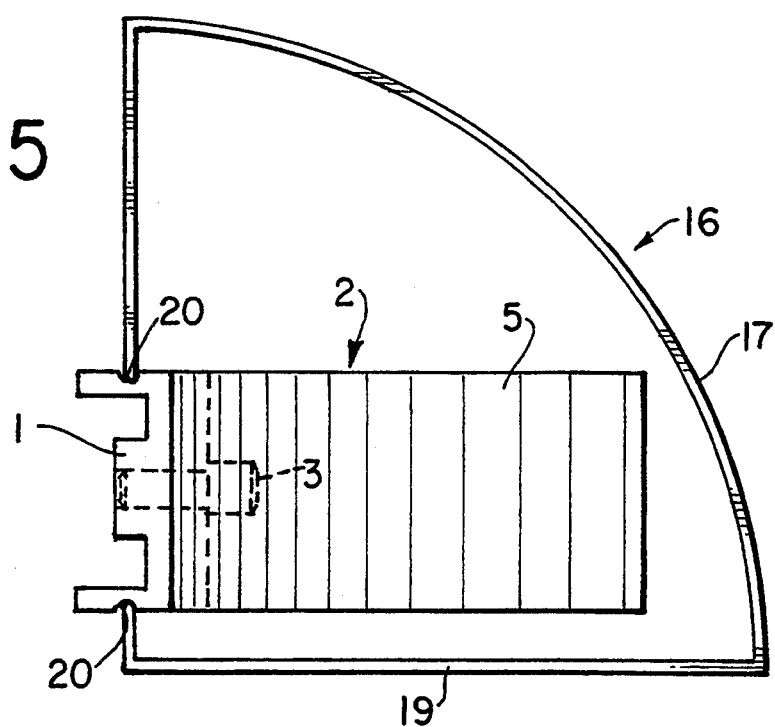
FIG. 5 is a plan view of the bracket of FIG. 1 equipped with a cover in accordance with the invention.

FIG. 5 is a plan view of the bracket of FIGS. 1 and 2 showing that either or both of the projections 2 may be provided with a cover 16 in order to enhance the appearance of the bracket. The cover 16 of FIG. 5 has an outline resembling a segment of a circle and includes a part-circular portion 17 as well as a pair of legs or protrusions 18 and 19 which extend generally radially of the part-circular portion 17. The leg 19 is L-shaped.

Each of the side faces of the support 1 is provided with a groove or recess 20 which extends continuously for the length of the support 1. The leg 18 is received in one of the grooves 20 while the shorter arm of the leg 19 is received in the other of the grooves 20 to thereby mount the cover 16 over the respective projection 2.

The cover configuration illustrated in FIG. 5 is only exemplary and the cover 16 may have any desired shape. Additional examples of the cover 16 are shown in FIGS. 6 and 7.

Figure 6:
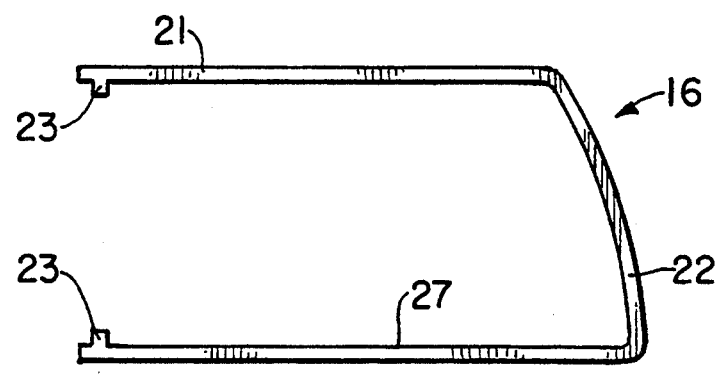
FIG. 6 is a plan view of a further embodiment of the cover.

The cover 16 of FIG. 6 has a generally U-shaped outline and includes a pair of legs 21 which are bridged by a curved web 22. In order to mount the cover 16 of FIG. 6 over a projection 2, the ends of the legs 21 remote from the web 22 are provided with protrusions 23 receivable in the grooves 20 of the support 21.

Figure 7:
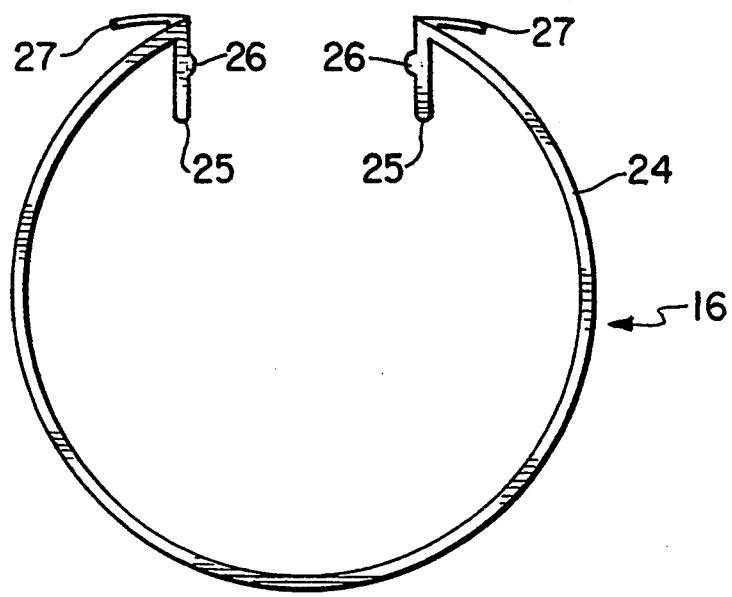
FIG. 7 is a plan view of an additional embodiment of the cover.

Referring to FIG. 7, the illustrated cover 16 resembles a segment of a cylinder and comprises a part-cylindrical wall 24 having a pair of confronting edges formed with inwardly extending flanges 25. Each of the flanges 25 is provided with a protrusion 26 which is receivable in a respective groove 20 of the support 1 to thereby mount the cover 16 of FIG. 7 over a projection 2.

An ear 27 is formed on the outside of the part-cylindrical wall 24 at each of the two confronting edges of such wall. The ears 27 are intended to hold an interchangeable decorative lining for the wall 24.

The use of covers is not limited to the bracket of FIGS. 1 and 2 but is applicable to all brackets of this type including the bracket of FIG. 4 and the bracket of Applicant's U.S. Pat. No. 5,271,591.

The bracket of the invention can be supplied as a kit for assembly at the location of use. Such a kit can include the strip-like support 1, means for attaching the support 1 to a wall or the like, a first projection 2 with pressure plate 10 and moving mechanisms 14, 15, a second projection 2 without pressure plate 10 and moving mechanisms 14, 15, screws 3 for mounting the projections 2 on the support 1, one or more covers 16 and, optionally, one or more decorative cover linings.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Bracket for mounting articles such as shelves, racks, and cabinets, comprising independently mountable first and second projections; and means for clamping part of an article between said projections, said clamping means including a clamping element receivable between said projections for movement in a direction from one of said projections towards the other of said projections, and means for moving said clamping element in said direction, said first projection having a clamping surface portion arranged to face said second projection and an external additional surface portion which diverges from said clamping surface portion at an angle different from 90 degrees, and said clamping and additional surface portions being oriented and designed so that loads on said first projection are transmitted to a support for said first projection.

2. The bracket of claim 1, wherein said clamping element is discrete from said projections; and further comprising means for holding said clamping element on a preselected one of said first and second projections.

3. The bracket of claim 1, wherein said second projection has a clamping surface portion arranged to face said first projection and an external additional surface portion which diverges from the respective clamping surface portion at an angle different from 90 degrees, said clamping and additional surface portions of said second projection being oriented and designed so that loads on said second projection are transmitted to a support for said second projection.

4. The bracket of claim 1 wherein said first projection is generally triangular.

5. The bracket of claim 1, wherein said first projection is hollow.

6. The bracket of claim 1, wherein said projections are designed to be at least approximately coextensive, said clamping element being designed to be at least approximately coextensive with said projections.

7. The bracket of claim 6, wherein said clamping element comprises a substantially flat plate and said other projection has a substantially flat clamping surface portion arranged to face said plate.

8. The bracket of claim 1, further comprising means for releasably mounting said projections on a support.

9. The bracket of claim 1, further comprising a strip-like support for said projections.

10. The bracket of claim 2, wherein said holding means includes a rod-like element which engages said clamping element and is mounted on said preselected projection.

11. Bracket for mounting articles such as shelves, racks and cabinets, comprising independently mountable first and second projections; and means for clamping part of an article between said projections, said clamping means including a clamping element receivable between said projections for movement in a direction from one of said projections towards the other of said projections, and means for moving said clamping element in said direction, said first projection being provided with a protuberance arranged to extend towards said second projection, and said protuberance defining a housing for at least part of said moving means.

12. The bracket of claim 11, wherein said first projection is provided with an additional protuberance arranged to extend towards said second projection, each of said protuberances defining a housing for part of said moving means.

13. Bracket for mounting articles such as shelves, racks, and cabinets, comprising independently mountable first and second projections; means for clamping part of an article between said projections, said clamping means including a clamping element receivable between said projections for movement in a direction from one of said projections towards the other of said projections, and means for moving said clamping element in said direction; and a strip-like support for said projections, said projections having respective clamping surface portions which are arranged to face one another, and at least one of said clamping surface portions being substantially flat and designed to be inclined to said support so that said clamping means can hold a flat article substantially horizontally when said support is inclined.

14. The bracket of claim 13, wherein said clamping element comprises a substantially flat plate designed to extend in substantial parallelism with said one clamping surface portion.

15. Bracket for mounting articles such as shelves, racks and cabinets, comprising independently mountable first and second projections; means for clamping part of an article between said projections, said clamping means including a clamping element receivable between said projections for movement in a direction from one of said projections towards the other of said projections, and means for moving said clamping element in said direction, said clamping element being discrete from said projections; and further comprising means for holding said clamping element on a preselected one of said first and second projections, said holding means including a rod-like element which engages said clamping element an dismounted on said preselected projection, and a resilient element which acts on said rod-like element and reacts against said preselected projection so as to urge said clamping element towards said preselected projection.

16. The bracket of claim 15, wherein said resilient element comprises a spring.

17. Bracket for mounting articles such as shelves, racks and cabinets, comprising first and second projections; means for clamping part of an article between said projections, said clamping means including a clamping element discrete from said projections and receivable between the latter for movement in a direction from one of said projections towards the other of said projections, and means for moving said clamping element in said direction; and means for holding said clamping element on a preselected one of said projections, said holding means including a rod-like element which engages said clamping element and is mounted on said preselected projection, and a resilient element which acts on said rod-like element and reacts against said preselected projection so as to urge said clamping element towards said preselected projection.

18. The bracket of claim 17, wherein said resilient element comprises a spring.

19. Bracket for mounting articles such as shelves, racks and cabinets, comprising independently mountable first and second projections; means for clamping part of an article between said projections, said clamping means including a clamping element receivable between said projections for movement in a direction from one of said projections towards the other of said projections, and means for moving said clamping element in said direction; and a strip-like support for said projections, said projections, clamping element and support being designed to be substantially flush laterally.

20. Bracket for mounting articles such as shelves, racks and cabinets, comprising first and second projections; means for clamping part of an article between said projections, said clamping means including a clamping element receivable between said projections, and means for moving said clamping element in a direction from one of said projections towards the other of said projections; and a cover for a predetermined one of said projections.

21. The bracket of claim 20, wherein said cover is generally part-cylindrical.

22. The bracket of claim 20, wherein said cover has a generally U-shaped outline.

23. The bracket of claim 20, wherein said cover has an outline generally resembling a segment of a circle.

24. The bracket of claim 20, wherein said cover is provided with means for attaching a decorative lining to said cover.

25. The bracket of claim 24, wherein said attaching means comprises a pair of ears.

26. The bracket of claim 20, further comprising a support for said predetermined projection, said cover and said support being provided with cooperating coupling elements for holding said cover on said support.

27. The bracket of claim 26, wherein said coupling elements include a recess on said support and a protrusion on said cover.

28. The bracket of claim 27, wherein said support is strip-like and has a lateral surface, said recess constituting a substantially continuous groove in said lateral surface extending along substantially the entire length of said support.

29. The bracket of claim 20, wherein said first projection has a clamping surface portion arranged to face said second projection and an external additional surface portion which diverges from said clamping surface portion at an angle different from 90 degrees, said clamping and additional surface portions being oriented and designed so that loads on said first projection are transmitted to a support for said first projection.

30. The bracket of claim 29, wherein said second projection has a clamping surface portion arranged to face said first projection and an external additional surface portion which diverges from the respective clamping surface portion at an angle different from 90 degrees, said clamping and additional surface portions of said second projection being oriented and designed so that loads on said second projection are transmitted to a support for said second projection.

31. The bracket of claim 29, wherein said first projection is generally triangular.

32. The bracket of claim 20, wherein said first projection is hollow.

33. The bracket of claim 20, wherein said first projection is provided with a protuberance arranged to extend towards said second projection, said protuberance defining a housing for at least part of said moving means.

34. The bracket of claim 33, wherein said first projection is provided with an additional protuberance arranged to extend towards said second projection, each of said protuberances defining a housing for part of said moving means.

35. The bracket of claim 20, further comprising means for releasably mounting said projections on a support.

36. The bracket of claim 20, further comprising a strip-like support for said projections.

37. The bracket of claim 36, wherein said projections, clamping element and support are designed to be substantially flush laterally.

38. The bracket of claim 36, wherein said projections have respective clamping surface portions arranged to face one another, at least one of said clamping surface portions being substantially flat and designed to be inclined to said support so that said clamping means can hold a flat article substantially horizontally when said support is inclined.

39. The bracket of claim 38, wherein said clamping element comprises a substantially flat plate designed to extend in substantial parallelism with said one clamping surface portion.

40. The bracket of claim 20, wherein said projections are designed to be at least approximately coextensive, said clamping element being designed to be at least approximately coextensive with said projections.

41. The bracket of claim 40, wherein said clamping element comprises a substantially flat plate and said other projection has a substantially flat clamping surface portion arranged to face said plate.

42. The bracket of claim 20, wherein said clamping element is discrete from said projections; and further comprising means for holding said clamping element on a preselected one of said first and second projections.

43. The bracket of claim 42, wherein said holding means includes a rod-like element which engages said clamping element and is mounted on said preselected projection.

44. The bracket of claim 43, wherein said holding means additionally comprises a resilient element which acts on said rod-like element and reacts against said preselected projection so as to urge said clamping element towards said preselected projection.

45. The bracket of claim 44, wherein said resilient element comprises a spring.

46. Bracket for mounting articles such as shelves, racks and cabinets, comprising first and second projections; means for clamping part of an article between said projections, said clamping means including a clamping element receivable between said projections for movement in a direction from one of said projections towards the other of said projections, and means for moving said clamping element in said direction; and a support for said projections, said projections having respective clamping surface portions arranged to face one another, and at least one of said clamping surface portions being substantially flat and designed to be inclined to said support so that said clamping means can hold a flat article substantially horizontally when said support is inclined.

47. The bracket of claim 46, wherein said first projection has an external additional surface portion which diverges from the respective clamping surface portion at an angle different from 90 degrees, said clamping and additional surface portions of said first projection being oriented and designed so that loads on said first projection are transmitted to said support.

48. The bracket of claim 47, wherein said second projection has an external additional surface portion which diverges from the respective clamping surface portion at an angle different from 90 degrees, said clamping and additional surface portions of said second projection being oriented and designed so that loads on said second projection are transmitted to said support.

49. The bracket of claim 47, wherein said first projection is generally triangular.

50. The bracket of claim 46, wherein said first projection is hollow.

51. The bracket of claim 46, wherein said first projection is provided with a protuberance arranged to extend towards said second projection, said protuberance defining a housing for at least part of said moving means.

52. The bracket of claim 51, wherein said first projection is provided with an additional protuberance arranged to extend towards said second projection, each of said protuberances defining a housing for part of said moving means.

53. The bracket of claim 46, further comprising means for releasably mounting said projections on said support.

54. The bracket of claim 46, wherein said support is strip-like.

55. The bracket of claim 54, wherein said projections, clamping element and support are designed to be substantially flush laterally.

56. The bracket of claim 46, wherein said clamping element comprises a substantially flat plate designed to extend in substantial parallelism with said one clamping surface portion.

57. The bracket of claim 56, wherein said projections are designed to be at least approximately coextensive, said plate being designed to be at least approximately coextensive with said projections.

58. The bracket of claim 46, wherein said clamping element is discrete from said projections; and further comprising means for holding said clamping element on a preselected one of said first and second projections.

59. The bracket of claim 58, wherein said holding means includes a rod-like element which engages said clamping element and is mounted on said preselected projection.

60. The bracket of claim 59, wherein said holding means additionally comprises a resilient element which acts on said rod-like element and reacts against said preselected projection so as to urge said clamping element towards said preselected projection.

61. The bracket of claim 60, wherein said resilient element comprises a spring.

62. The bracket of claim 46, further comprising a cover for said first projection.

63. Bracket for mounting articles such as shelves, racks and cabinets, comprising first and second projections; means for clamping part of an article between said projections, said clamping means including a clamping element discrete from said projections and receivable between the latter for movement in a direction from one of said projections towards the other of said projections, and means for moving said clamping element in said direction, said first projection having a clamping surface portion arranged to face said second projection and an external additional surface portion which diverges from said clamping surface portion at an angle different from 90 degrees, and said clamping and additional surface portions being oriented and designed so that loads on said first projection are transmitted to a support for said first projection; and means for holding said clamping element on a preselected one of said projections.

64. The bracket of claim 63, wherein said holding means includes a rod-like element which engages said clamping element and is mounted on said preselected projection.

65. The bracket of claim 63, wherein said projections are designed to be at least approximately coextensive, said clamping element being designed to be at least approximately coextensive with said projections.

66. The bracket of claim 65, wherein said clamping element comprises a substantially flat plate and said other projection has a substantially flat clamping surface portion arranged to face said plate.

67. The bracket of claim 63, further comprising means for releasably mounting said projections on a support.

68. The bracket of claim 63, wherein said second projection has a clamping surface portion arranged to face said first projection and an external additional surface portion which diverges from the respective clamping surface portion at an angle different from 90 degrees, said clamping and additional surface portions of said second projection being oriented and designed so that loads on said second projection are transmitted to a support for said second projection.

69. The bracket of claim 63, wherein said first projection is generally triangular.

70. The bracket of claim 63, wherein said first projection is hollow.

71. The bracket of claim 63, further comprising a strip-like support for said projections.

72. Bracket for mounting articles such as shelves, racks and cabinets, comprising first and second projections; means for clamping part of an article between said projections, said clamping means including a clamping element discrete from said projections and receivable between the latter for movement in a direction from one of said projections towards the other of said projections, and means for moving said clamping element in said direction, said first projection being provided with a protuberance arranged to extend towards said second projection, and said protuberance defining a housing for at least part of said moving means; and means for holding said clamping element on a preselected one of said projections.

73. The bracket of claim 72, wherein said first projection is provided with an additional protuberance arranged to extend towards said second projection, each of said protuberances defining a housing for part of said moving means.

74. Bracket for mounting articles such as shelves, racks and cabinets, comprising first and second projections; means for clamping part of an article between said projections, said clamping means including a clamping element discrete from said projections and receivable between the latter for movement in a direction from one of said projections towards the other of said projections, and means for moving said clamping element in said direction; means for holding said clamping element on a preselected one of said projections; and a strip-like support for said projections, said projections having respective clamping surface portions which are arranged to face one another, and at least one of said clamping surface portions being substantially flat and designed to be inclined to said support so that said clamping means can hold a flat article substantially horizontally when said support is inclined.

75. The bracket of claim 74, wherein said clamping element comprises a substantially flat plate designed to extend in substantial parallelism with said one clamping surface portion.

76. Bracket for mounting articles such as shelves, racks and cabinets, comprising first and second projections; means for clamping part of an article between said projections, said clamping means including a clamping element discrete from said projections and receivable between the latter for movement in a direction from one of said projections towards the other of said projections, and means for moving said clamping element in said direction; means for holding said clamping element on a preselected one of said projections; and a cover for said first projection.

77. Bracket for mounting articles such as shelves, racks and cabinets, comprising independently mountable first and second projections; means for clamping part of an article between said projections, said clamping means including a clamping element receivable between said projections for movement in a direction from one of said projections towards the other of said projections, and means for moving said clamping element in said direction; and a cover for said first projection.

78. Bracket for mounting articles such as shelves, racks and cabinets, comprising first and second projections; means for clamping part of an article between said projections, said clamping means including a clamping element discrete from said projections and receivable between the latter for movement in a direction from one of said projections towards the other of said projections, and means for moving said clamping element in said direction; means for holding said clamping element on a preselected one of said projections; and a strip-like support for said projections, said projections, clamping element and support being designed to be substantially flush laterally.

* * * * *